United States Patent
Duong

(10) Patent No.: US 7,281,853 B2
(45) Date of Patent: Oct. 16, 2007

(54) BEARING MATERIAL

(75) Inventor: Loc Quang Duong, South Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 42 days.

(21) Appl. No.: 10/725,165

(22) Filed: Dec. 1, 2003

(65) Prior Publication Data

US 2005/0117823 A1 Jun. 2, 2005

(51) Int. Cl.
*F16C 33/12* (2006.01)
(52) U.S. Cl. .................. 384/276; 384/907; 384/913
(58) Field of Classification Search ............ 384/276, 384/294, 913, 907; 428/676, 677, 908, 926; 428/610; 148/902, 907
See application file for complete search history.

(56) References Cited

U.S. PATENT DOCUMENTS

| 4,719,818 A | * | 1/1988 | McCreary ............ 475/159 |
| 4,788,082 A | | 11/1988 | Schmitt |
| 4,889,772 A | * | 12/1989 | Bergmann et al. ......... 428/547 |
| 4,904,362 A | | 2/1990 | Gaertner et al. |
| 5,489,487 A | * | 2/1996 | Tanaka et al. ............ 384/276 |
| 5,571,332 A | | 11/1996 | Halpern |
| 5,658,079 A | | 8/1997 | Struziak et al. |
| 5,685,797 A | | 11/1997 | Barnsby et al. |
| 6,089,755 A | * | 7/2000 | Okamoto et al. .......... 384/276 |
| 6,139,191 A | | 10/2000 | Andler et al. |
| 6,273,612 B1 | * | 8/2001 | Ono et al. ............... 384/276 |
| 6,348,114 B1 | | 2/2002 | Oshiro et al. |
| 6,588,934 B2 | | 7/2003 | Law |
| 6,802,649 B2 | | 10/2004 | Kawagoe et al. |

FOREIGN PATENT DOCUMENTS

| JP | 218923 | 2/1990 |
| SU | 502935 | 2/1976 |
| SU | 1186848 A1 | 10/1985 |
| SU | 1763741 A1 | 9/1992 |

* cited by examiner

*Primary Examiner*—Thomas R. Hannon
(74) *Attorney, Agent, or Firm*—Bachman & LaPointe, P.C.

(57) ABSTRACT

A journal bearing system includes a bushing and a journal pin within the bushing. At least one of the bushing and journal pin has an engagement surface with an engagement length comprising a substrate material and a solid lubricant. A concentration of the solid lubricant varies along the engagement length.

23 Claims, 1 Drawing Sheet

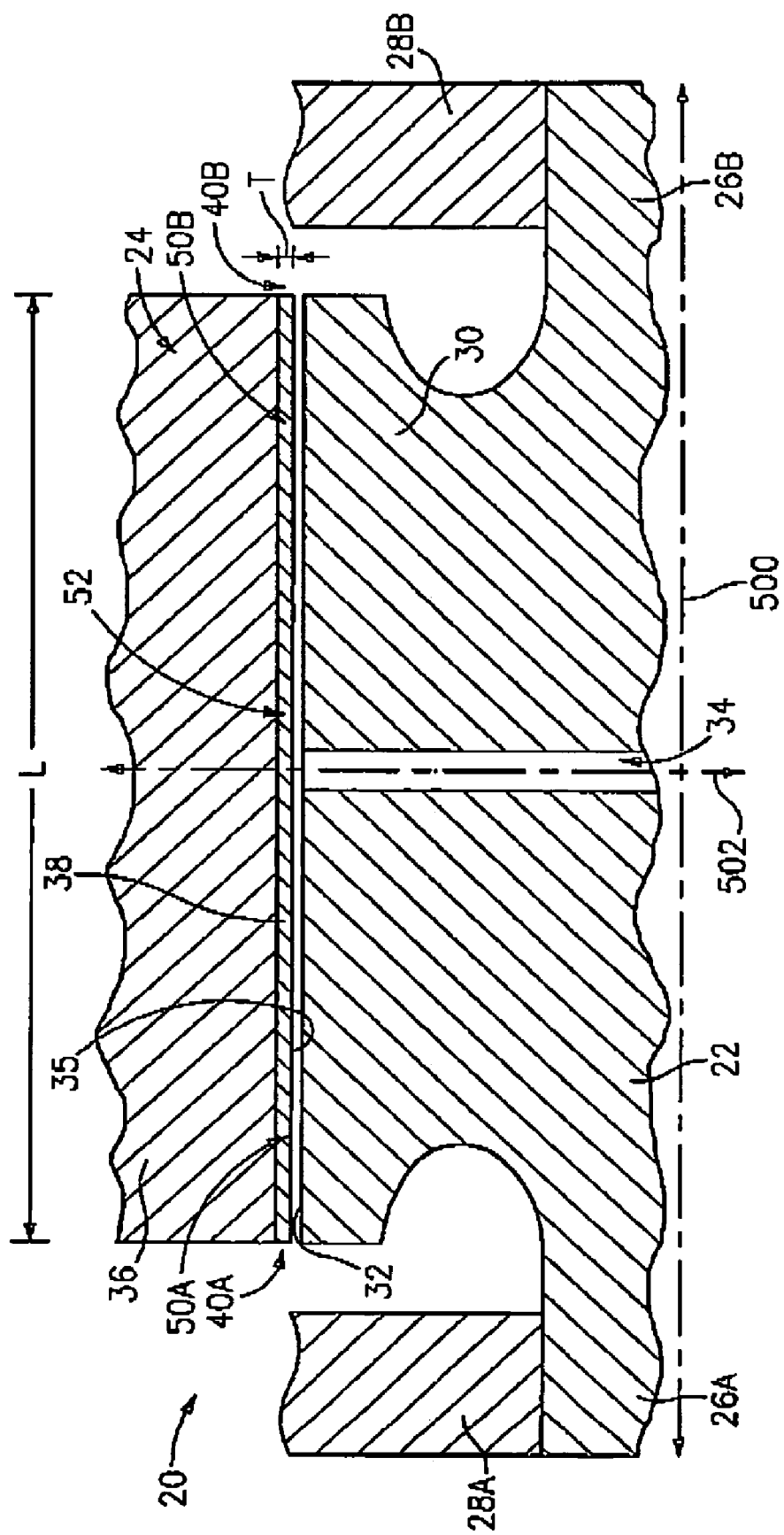

BEARING MATERIAL

BACKGROUND OF THE INVENTION (1) Field of the Invention

The invention relates to bearing materials. More particularly, the invention relates to anti-friction materials for journal bearings.

(2) Description of the Related Art

Journal bearings are used as structural supports for rotating parts. Hydrodynamic bearings utilize a film of liquid lubricant between the journal pin and bushing. In common configurations, the journal pin is formed of a relatively rigid, non-lubricious, material. The bushing, or at least a surface layer thereof, is formed of a more compliant, more lubricious, bearing material. Advantageous properties for such bearing materials involve an appropriate combination of lubricity, high thermal conductivity, and fatigue strength. Lubricity is desirable even in the context of a hydrodynamic bearing to augment the liquid lubricant and address abnormal conditions causing local or total loss of liquid lubricant. Common metallic journal bearing materials include alloys or other combinations of tin, lead, aluminum, silver, and copper. Of particular interest are the journal bearings of planetary gears in fan drive gear systems for turbofan engines. Exemplary bearing material in that application utilizes copper as a base constituent and lead as a solid lubricant. Exemplary lead concentrations are 21-30% by weight. Exemplary manufacturing techniques involve codeposition of the copper and lead to create a copper matrix with embedded lead particles. Other materials may be used. For example, U.S. Pat. No. 6,588,934, the disclosure of which is incorporated by reference herein as if set forth at length, discloses a copper-silver combination.

Nevertheless, there remains room for improvement in the art.

SUMMARY OF THE INVENTION

One aspect of the invention involves a journal bearing system. The system includes a bushing and a journal pin within the bushing. At least one of the bushing and journal pin has an engagement surface with an engagement length comprising a substrate material and a solid lubricant. A concentration of the solid lubricant varies along the engagement length.

In various implementations, the concentration may be higher near ends of the engagement length than in an intermediate portion. The concentration may vary by at least 50% of a maximum value along said engagement length. The base material may comprise a coating applied to a substrate. The apparatus of the substrate may comprise a copper-based material and the solid lubricant may comprise a metal. The solid lubricant metal may comprise lead. The concentration may be greater than 30% at first and second locations near first and second ends of the engagement length and 10-30% in an third location, between the first and second locations. The concentration may be greater than 35% at first and second locations within first and second terminal 20% of the engagement length and 10-30% over a majority of a central 50% of the length. The system may support a gear in a turbofan transmission.

Another aspect of the invention involves a hydrodynamic bearing apparatus comprising a bushing, a journal pin, and means for providing extended operation after a lubricant loss. In various implementations, the means may comprise a longitudinally varying lead concentration within a copper matrix.

Another aspect of the invention involves a method for preparing a lining for a hydrodynamic bearing. A solid lubricant is applied along the lining, the solid lubricant being applied with concentration that varies along a length of the lining.

In various implementations, the application of the solid lubricant may comprise sputtering. The application of the solid lubricant may be simultaneous with the application of a base material.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The FIGURE is a semi-schematic longitudinal sectional view of a bearing system according to principles of the invention.

Like reference numbers and designations in the various drawings indicate like elements.

DETAILED DESCRIPTION

The FIGURE shows a bearing system 20 comprising a journal 22 and a bushing 24. The journal and bushing share a central longitudinal axis 500. A transverse centerplane 502 is also shown. The exemplary journal has shaft portions 26A and 26B at first and second ends mounted to associated carrier plates 28A and 28B. The journal has a central portion 30 having a cylindrical bearing surface 32. A lubrication passageway 34 extends to the surface 32 from a central passageway (not shown) to introduce liquid lubricant (e.g., oil) to a space between the bearing surface 32 and a mating bearing surface 35 of the bushing. The exemplary bushing includes a substrate 36 and a coating 38 applied to an inner (interior) cylindrical surface of the substrate. The interior cylindrical surface of the coating 38 provides the bushing bearing surface 35. In the exemplary embodiment, the coating extends along a length L between first and second ends 40A and 40B and has a thickness T. In an exemplary application, the substrate 24 may be a metallic (e.g., steel) planetary gear in a fan drive transmission of a turbofan engine. In such an application, the journal 22 may also be formed of steel. An exemplary coating 38 comprises a base material (e.g., copper) and a solid lubricant (e.g., lead). The combined base and solid lubricant materials may be gradually built up on the substrate inner surface. Exemplary codeposition techniques include sputtering (e.g., U.S. Pat. No. 4,904,362), electron jet vapor deposition (e.g., U,S. Pat. No. 5,571,332), chemical vapor plating (U.S. Pat. No. 4,788,082), plasma spraying, and electroplating.

With an exemplary engagement region between the two bearing surfaces sharing the length L, according to the present invention the composition of the coating 38 varies longitudinally along such engagement region. In the exemplary embodiment, the coating composition may be circumferentially uniform at any given longitudinal position. In the exemplary embodiment, the coating composition may be radially uniform at an given longitudinal position.

In the exemplary embodiment, the composition non-uniformity provides relatively high concentrations of solid lubricant near the ends 40A and 40B and relatively low concentrations in a central region. With uniform coating compositions, a loss of the hydrodynamic lubrication typically results in bearing failure (e.g., melting and/or seizure). Failures are typically observed near the ends of the bearing. The higher than normal solid lubricant concentrations may avoid or delay such failure. The remaining lesser concentration region serves to provide sufficient bearing static strength and wear resistance during normal operation. For example, a uniform high concentration of solid lubricant might leave the coating with too little strength to resist static deformation and achieve a desired normal operating life.

The drawing shows high solid lubricant concentrations regions 50A and 50B and a central low concentration region 52. In the exemplary implementation, the dividing lines between the high and low concentration regions may occur approximately 25% of the length L inboard of the end portions. Clearly, however, in many implementations abrupt changes in concentration may be impractical. The changes may be as abrupt as any given manufacturing technology can provide or may be yet more gradual. In an exemplary implementation, the dominant concentration in the central region 52 is a fairly standard 28% lead (by weight unless otherwise identified). This may represent the minimum concentration along the length. The dominant concentration in the end regions may be in the range of 35-45% lead. The peak of this value may represent the maximum concentration along the length. An exemplary broader concentration for the central region is 20-30%. An exemplary broader concentration for the end regions is 30-50%. The end region lengths may be 25%, 20%, 15%, and 10%. Concentrations in any given region may be measured in terms of concentration at any point in the region, mean concentration, median concentration, or other characteristic concentration. Exemplary coating thicknesses T are 0.0005-0.0045 inch, more narrowly 0.0010-0.0030 inch. Although illustrated with respect to a symmetric distribution, a distributed loading (especially loading in lubrication failure conditions) may suggest asymmetric distributions. For example, the end regions may be of different lengths and the peak or other characteristic concentrations in those regions may differ. Even within the basic copper-lead system described, other components may be included for a variety of purposes as are known in the art or may yet be developed.

One or more embodiments of the present invention have been described. Nevertheless, it will be understood that various modifications may be made without departing from the spirit and scope of the invention. For example, the principles of the invention may be applied to existing or other bearing configurations and to existing or other manufacturing techniques. The particular uses, configurations, and techniques may influence any particular implantation. Accordingly, other embodiments are within the scope of the following claims.

What is claimed is:

1. A journal bearing system supporting a gear in a turbofan transmission and comprising:
   a bushing in the gear; and
   a journal pin within the bushing and rotatable relative to the bushing about a longitudinal axis,
   wherein at least one of the bushing and journal pin has an engagement surface with an engagement length comprising a base material and a solid lubricant, a concentration of the solid lubricant varying longitudinally along the engagement length.

2. The system of claim 1 wherein:
   the concentration is higher near ends of the engagement length than in an intermediate portion.
3. The system of claim 1 wherein:
   the concentration varies by at least 50% of a maximum value along said engagement length.
4. The system of claim 1 wherein the transmission is liquid-lubricated and the solid lubricant concentration provides extended operation after a loss of liquid lubricant.
5. The system of claim 1 wherein said concentration is a concentration of the solid lubricant within a matrix of the base material.
6. The system of claim 1 wherein:
   the base material comprises a coating applied to a substrate of said at least one of the bushing and journal pin.
7. The system of claim 6 wherein:
   the base material comprises a copper-based material; and
   the solid lubricant comprises a metal.
8. The system of claim 1 wherein the journal pin has at least one lubrication passageway.
9. The system of claim 8 wherein the at least one lubrication passageway extends to the engagement surface.
10. The system of claim 1 wherein:
    the base material comprises a copper-based material; and
    the solid lubricant comprises a metal.
11. The system of claim 10 wherein the journal pin has at least one lubrication passageway.
12. The system of claim 11 wherein the at least one lubrication passageway extends to the engagement surface.
13. The system of claim 10 wherein:
    the solid lubricant metal comprises lead.
14. The system of claim 13 wherein the concentration is:
    greater than 35% at first and second locations within first and second terminal 20% of the engagement length; and
    10-30% over a majority of a central 50% of the length.
15. The system of claim 13 wherein the concentration is:
    greater than 30% at first and second locations near first and second ends of the engagement length; and
    10-30% in an third location, between the first and second locations.
16. The system of claim 15 wherein the journal pin has at least one lubrication passageway.
17. The system of claim 16 wherein the at least one lubrication passageway extends to the engagement surface.
18. A hydrodynamic bearing apparatus comprising:
    a bushing being a gear in a geared turbofan transmission;
    a journal pin rotatable relative to the bushing about a longitudinal axis; and
    means for providing extended operation after a lubricant loss comprising a coating on the bushing, said coating comprising a longitudinally-varying lead concentration with a copper matrix.
19. The apparatus of claim 18 wherein the journal pin has at least one lubrication passageway.
20. The apparatus of claim 18 wherein:
    the gear is steel; and
    the coating comprises substrate material and solid lubricant on an interior cylindrical surface of the gear.
21. A hydrodynamic bearing apparatus comprising:
    a bushing;
    a journal pin rotatable relative to the bushing about a longitudinal axis;
    at least one port in at least one of the bushing and journal pin for introducing a liquid lubricant; and a solid lubricant within a matrix on at least one of the bushing and journal pin, a distribution of said solid lubricant forming means for providing extended operation after a loss of said liquid lubricant.

22. A journal bearing system comprising:

a bushing; and a journal pin within the bushing and rotatable relative to the bushing about a longitudinal axis, wherein:

at least one of the bushing and journal pin has an engagement surface with an engagement length comprising a base material and a solid lubricant, a concentration of the solid lubricant varying longitudinally along the engagement length;

the base material comprises a copper-based material; and the solid lubricant metal comprises lead;

the concentration is:

greater than 30% at first and second locations near first and second ends of the engagement length; and 10-30% in an third location, between the first and second locations.

23. The system of claim 22 wherein the concentration is:

greater than 35% at said first and second locations, said first and second locations within first and second terminal 20% of the engagement length; and 10-30% over a majority of a central 50% of the length.

* * * * *